(12) United States Patent
Takeuchi et al.

(10) Patent No.: US 9,082,430 B2
(45) Date of Patent: Jul. 14, 2015

(54) OPTICAL INFORMATION RECORDING MEDIUM

(71) Applicant: Sony Corporation, Tokyo (JP)

(72) Inventors: Atsushi Takeuchi, Miyagi (JP); Katsuya Owada, Park Ridge, NJ (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/127,243

(22) PCT Filed: Apr. 18, 2013

(86) PCT No.: PCT/JP2013/062146
§ 371 (c)(1),
(2) Date: Dec. 18, 2013

(87) PCT Pub. No.: WO2013/161916
PCT Pub. Date: Oct. 31, 2013

(65) Prior Publication Data
US 2015/0036473 A1    Feb. 5, 2015

(30) Foreign Application Priority Data

Apr. 26, 2012  (JP) ................. 2012-101660
Mar. 5, 2013   (JP) ................. 2013-042746

(51) Int. Cl.
*G11B 7/24*       (2013.01)
*G11B 7/24062*    (2013.01)
*G11B 7/24076*    (2013.01)
*G11B 7/248*      (2006.01)
*G11B 7/1374*     (2012.01)
*G11B 7/24027*    (2013.01)
*G11B 7/24035*    (2013.01)
*G11B 7/2405*     (2013.01)

(52) U.S. Cl.
CPC .......... *G11B 7/24062* (2013.01); *G11B 7/1374* (2013.01); *G11B 7/2405* (2013.01); *G11B 7/248* (2013.01); *G11B 7/24027* (2013.01); *G11B 7/24035* (2013.01); *G11B 7/24076* (2013.01)

(58) Field of Classification Search
CPC .... G11B 7/246; G11B 7/24038; G11B 7/258; G11B 7/256; G11B 2007/24612; G11B 7/24079
USPC ................. 428/64.4, 64.8; 369/275.4, 275.2, 369/275.1, 288, 100, 94, 284, 124.01, 369/59.12, 283, 124.14
See application file for complete search history.

(56) References Cited

U.S. PATENT DOCUMENTS 7,674,568 B2 *  3/2010  Milner et al. ............. 430/270.14
7,910,192 B2 *  3/2011  Wakabayashi et al. ...... 428/64.9
2006/0105133 A1  5/2006  Milner et al.
2010/0068443 A1  3/2010  Wakabayashi et al.
2010/0090358 A1  4/2010  Furomoto et al.

FOREIGN PATENT DOCUMENTS

JP    08-055367       2/1996
JP    2007-152825     6/2007
JP    2007-220268     8/2007
(Continued)

*Primary Examiner* — Ali Neyzari
(74) *Attorney, Agent, or Firm* — K&L Gates LLP (57) ABSTRACT

An optical information recording medium includes a substrate that has a recessed portion on a surface thereof, a recording layer, and a reflective layer. By combination of ranges of an optical density of the recording layer and a depth of the recessed portion of the substrate, degradation of reflectance is suppressed.

7 Claims, 5 Drawing Sheets

(56) References Cited

FOREIGN PATENT DOCUMENTS

| | | |
|---|---|---|
| JP | 2008-108414 | 5/2008 |
| JP | 2009-064547 | 3/2009 |
| JP | 2010-134978 | 6/2010 |
| JP | 2010-282706 | 12/2010 |
| JP | 2011-183580 | 9/2011 |

* cited by examiner

OPTICAL INFORMATION RECORDING MEDIUM

CROSS REFERENCES TO RELATED APPLICATIONS

The present application is a national stage of International Application No. PCT/JP2013/062146 filed on Apr. 18, 2013 and claims priority to Japanese Patent Application No. JP 2012-101660 filed on Apr. 26, 2012, and JP 2013-042746 filed on Mar. 5, 2013, the disclosure of which is incorporated herein by reference.

BACKGROUND

The present technology relates to an optical information recording medium. More specifically, the present technology relates to an optical information recording medium that includes a substrate having a recessed portion on a surface thereof, a recording layer, and a reflective layer.

As a recordable optical information recording medium, there are a rewritable optical information recording medium represented by a compact disc-rewritable (CD-RW) or a digital versatile disc±rewritable (DVD±RW) and a write-once optical information recording medium represented by a compact disc-recordable (CD-R) or a digital versatile disc-recordable (DVD-R), but in particular, the latter has contributed greatly to the expansion of the market as low-cost media.

As a recording material used for the write-once optical information recording medium, there are an inorganic material and an organic dye material, but conventionally, the organic dye material has been mainly examined as the recording material. As an optical information recording medium using the organic dye material, an optical information recording medium having a configuration in which a reflective layer is provided on a surface of a recording layer including the organic dye material has been adopted. As a material of the reflective layer, silver (Ag) is widely used. As a material other than silver (Ag), an example in which aluminum (Al) is used is disclosed (for example, see PTLs 1 to 4).

CITATION LIST

Patent Literature

PTL 1: Japanese Unexamined Patent Application Publication No. 5-54431
PTL 2: Japanese Unexamined Patent Application Publication No. 5-62245
PTL 3: Japanese Unexamined Patent Application Publication No. 6-195746
PTL 4: Japanese Unexamined Patent Application Publication No. 6-282870

SUMMARY

Technical Problem

In recent years, a further reduction in costs of the medium has been desired, and as a technology to meet this demand, a case in which aluminum (Al) is used instead of silver (Ag) as the material of the reflective layer has been examined. However, when using aluminum (Al) as the material of the reflective layer, the reflectance is degraded compared to a case when using silver (Ag) as the material of the reflective layer.

The present technology provides an optical information recording medium that can suppress degradation of the reflectance.

Technical Solution

In order to solve the above described problem, the present technology provides an optical information recording medium including: a substrate that has a recessed portion on a surface thereof; a recording layer; and a reflective layer, in which degradation of the reflectance is suppressed by combination of ranges of an optical density of the recording layer and a depth of the recessed portion of the substrate.

Advantageous Effects

As described above, According to the present technology, degradation of the reflectance can be suppressed.

Additional features and advantages are described herein, and will be apparent from the following Detailed Description and the figures.

DETAILED DESCRIPTION

Embodiments of the present technology will be described with reference to the accompanying drawings in the following order.

1. Summary
2. Configuration of optical information recording medium
3. Optical characteristics of optical information recording medium
4. Principle of compatibility between push-pull signal PPb and maximum reflectance $R_{top}$
5. Method of manufacturing optical information recording medium

[1. Summary]

When using aluminum (Al) as a material of a reflective layer, the reflectance is degraded compared to when using silver (Ag) as the material of the reflective layer, and therefore it is difficult to achieve a good balance between an excellent push-pull signal and reflectance. According to the findings of the present inventors, the push-pull signal and the reflectance are in a conflicting relation. That is, when increasing a depth of a recessed portion (for example, groove) of a substrate, the push-pull signal can be improved, but the reflectance can be degraded. Thus, in order to achieve the good balance between the excellent push-pull signal and the reflectance, keen examination has been made by the present inventors. As a result, the present inventors have found that variation of the reflectance with respect to a change in the depth of the recessed portion is suppressed in a case in which optical density of a recording layer of a predetermined range and the depth of the recessed portion of the substrate of a predetermined range are combined, contrary to prediction.

[2. Configuration of Optical Information Recording Medium]

Figure 1:
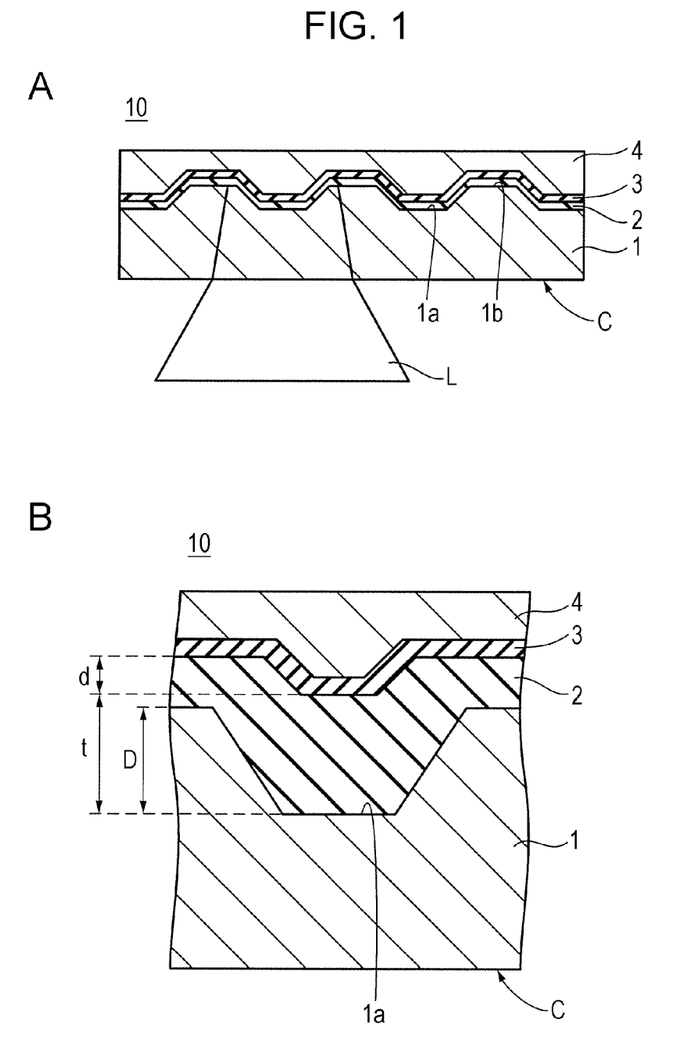
FIG. 1A is a schematic cross-sectional view showing a configuration example of an optical information recording medium according to an embodiment of the present technology.
FIG. 1B is an enlarged cross-sectional view showing a part of FIG. 1A.

FIG. 1A is a schematic cross-sectional view showing a configuration example of an optical information recording medium according to an embodiment of the present technology, and FIG. 1B is an enlarged cross-sectional view showing a part of FIG. 1A. The optical information recording medium 10 is a so-called write-once optical information recording medium in a single layer, and as shown in FIG. 1A, a recording layer 2, a reflective layer 3, and a protection layer 4 are laminated on one main surface of the substrate 1 in this stated order.

In the optical information recording medium 10 according to the present embodiment, by irradiating the recording layer 2 with a laser beam L from a surface C of the substrate 1 side, recording or reproduction of information signals is performed. For example, by condensing the laser beam L having a wavelength in a range of 770 nm to 790 nm using an objective lens having a numerical aperture in a range of 0.44 to 0.46 and irradiating the recording layer 2 with the condensed laser beam from the surface C of the substrate 1 side, recording or reproduction of the information signals is performed. As such an optical information recording medium 10, for example, a CD-R in a single layer can be used.

Hereinafter, the substrate 1, the recording layer 2, the reflective layer 3, and the protection layer 4 which constitute the optical information recording medium 10 will be sequentially described.

(Substrate)

The substrate 1 has an annular shape while providing an opening (hereinafter, referred to as center hole) at a center. One main surface of the substrate 1 is an uneven surface, and the recording layer 2 is provided on the uneven surface. Hereinafter, a recessed portion of the uneven surface is referred to as a groove 1a and a projection portion thereof is referred to as a land 1b.

As a shape of the groove 1a and the land 1b, for example, various shapes such as a spiral shape, a concentric shape, and the like can be used. In addition, the groove 1a and/or the land 1b is wobbled (meanders) for the purpose of, for example, stabilization of linear velocity, address information addition, or the like.

A diameter of the substrate 1 is selected as, for example, 120 mm. A thickness of the substrate 1 is selected in consideration of rigidity, preferably 0.3 mm to 1.3 mm, more preferably 0.6 mm to 1.3 mm, and is selected as, for example, 1.2 mm. In addition, a diameter of the center hole is selected as, for example, 15 mm. A thickness D of the groove 1a of the substrate 1 is in, for example, a range of 198 nm to 220 nm.

As a material of the substrate 1, for example, a plastic material or glass can be used, and in view of cost, the plastic material is preferably used. As the plastic material, for example, a polycarbonate resin, a polyolefin resin, an acrylic resin, and the like can be used.

(Recording Layer)

The recording layer 2 is a recording layer capable of recording information signals by irradiation of the laser beam L. The recording layer 2 includes an organic dye as a main component. As the organic dye, at least one of, for example, phthalocyanine dyes, naphthalocyanine dyes, porphyrin dyes, cyanine dyes, merocyanine dyes, styryl dyes, squarylium dyes, and azo dyes can be used.

(Reflective Layer)

The reflective layer 3 preferably includes aluminum (Al) as a main component. This is because the cost of the optical information recording medium 10 can be reduced compared to a case in which the reflective layer 3 includes silver (Ag) as the main component.

(Protection Layer)

The protection layer 4 is a resin layer obtained by curing a photosensitive resin such as an ultraviolet curing resin or the like. As a material of the resin layer, for example, an ultraviolet curing acrylic resin is used.

[3. Optical Characteristics of Optical Information Recording Medium]

By combination of ranges of optical density (OD) of the recording layer 2 and the depth D of the groove 1a of the substrate 1, a reduction of a maximum reflectance $R_{top}$ is suppressed. By this suppression, the maximum reflectance $R_{top}$ is maintained in a range of, preferably, 0.6 or larger. When the maximum reflectance $R_{top}$ is 0.6 or larger, recording or reproduction of the optical information recording medium 10 can be satisfactorily performed by a general consumer drive.

By the combination of the ranges of the optical density of the recording layer 2 and the depth D of the groove 1a of the substrate 1, it is preferable that a push-pull signal PPb at an unrecorded time be improved. By this improvement, it is preferable that the push-pull signal PPb at an unrecorded time be set in a range of 0.080 to 0.13. When the push-pull signal PPb at an unrecorded time is in this range, recording of the optical information recording medium 10 can be satisfactorily performed by the general consumer drive.

In a case in which recording or reproduction of information signals is performed by condensing, by the optical information recording medium 10, a laser beam L having a wavelength in a range of 770 nm to 790 nm using an objective lens having a numerical aperture in a range of 0.44 to 0.46 and irradiating the recording layer 2 with the condensed light from a surface C of the substrate 1 side, it is preferable that a range of the optical density of the recording layer 2 be a range larger than 0.560 and less than or equal to 0.700, and a range of the depth D of the groove 1a of the substrate 1 be a range of 198 nm to 220 nm. This is because, when the depth D of the groove 1a is in the range of 198 nm to 220 nm, the push-pull signal PPb at an unrecorded time can be increased depending on an increase in the depth D of the groove 1a, and variation of the maximum reflectance $R_{top}$ with respect to a change in the depth of the groove 1a can be suppressed.

In the case in which recording or reproduction of information signals is performed by condensing, by the optical information recording medium 10, a laser beam L having a wavelength in the range of 770 nm to 790 nm using the objective lens having a numerical aperture in a range of 0.44 to 0.46 and irradiating the recording layer 2 with the condensed light from the surface C of the substrate 1 side, it is more preferable that the range of the optical density of the recording layer 2 be a range larger than 0.560 and less than or equal to 0.710, and the range of the depth D of the groove 1a of the substrate 1 be a range of 203.5 nm to 220 nm. This is because, when the depth D of the groove 1a is in the range of 203.5 nm to 220 nm, the push-pull signal PPb at an unrecorded time can be increased depending on the increase in the depth D of the groove 1a, and variation of the maximum reflectance $R_{top}$ with respect to the change in the depth of the groove 1a can be suppressed.

By the combination of the ranges of the optical density of the recording layer 2 and the depth D of the groove 1a of the substrate 1, it is preferable that the variation of the maximum reflectance $R_{top}$ in the range of the depth D of the groove 1a be suppressed. More specifically, It is preferable that, by the combination of the ranges of the optical density of the recording layer 2 and the depth D of the groove 1a of the substrate 1, the variation of the maximum reflectance $R_{top}$ with respect to the increase in the depth D of the groove 1a be suppressed while the push-pull signal PPb at an unrecorded time is increased depending on an increase in the depth D of the groove 1a in the range of the depth D of the groove 1a. By such suppression of the variation of the maximum reflectance $R_{top}$, it is preferable that the maximum reflectance $R_{top}$ be substantially constant. Here, being substantially constant means that the range of variation of the maximum reflectance $R_{top}$ is 0.015 or less.

The maximum reflectance $R_{top}$ is a reflectance when a reproduction signal corresponding to a 11T signal of an EFM modulation signal is at a maximum level, and is expressed by the following Equation (1).

$$R_{top}=R_0 \times I_{top}/I_0 \quad (1)$$

Here, $R_0$ denotes a reflectance in a mirror surface portion on the optical information recording medium 10, $I_0$ denotes a reproduction signal level in the mirror surface portion, and $I_{top}$ denotes a maximum level of a reproduction signal corresponding to the 11T signal of the EFM modulation signal.

The push-pull signal PPb at an unrecorded time is expressed by the following Equation (2).

$$PPb=(I_1-I_2)_{pp}/(I_1+I_2)_{max} \quad (2)$$

Here, $I_1$ and $I_2$ represent each output when dividing a light receiving element of an optical detector into two in a radial direction, pp represents peak-to-peak, and max represents a maximum value.

The optical density is a dimensionless quantity that indicates how much intensity is weakened when light has passed through a certain object. When not including scattering and reflection, the optical density is simply called absorbance. In analytical chemistry, optical density Aλ at a wavelength λ is defined by the following Equation (3)

$$A_\lambda=-\log_{10}(I/I_0) \quad (3)$$

I: transmitted light intensity
$I_0$: incident light intensity

Absorbance is represented by a logarithm while transmittance is an exponential function of an optical path length, and therefore the absorbance, being proportional to the optical path length, is used to measure a film thickness of an organic dye.

[4. Principle of Compatibility Between Push-pull Signal PPb and Maximum Reflectance $R_{top}$]

Figure 2:
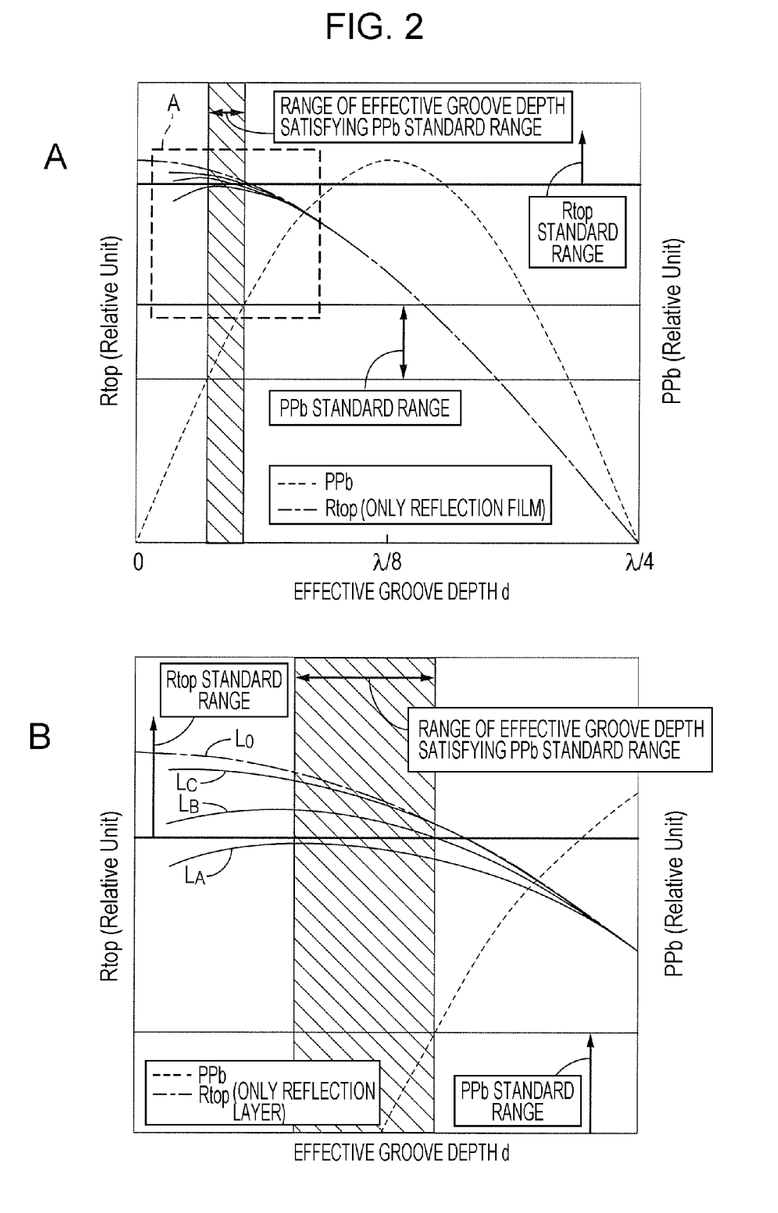
FIG. 2A is a view showing changes in a maximum reflectance $R_{top}$ with respect to an effective groove depth d and a push-pull signal PPb.
FIG. 2B is an enlarged view showing an area A of FIG. 2A.

FIG. 2A is a view showing changes in a maximum reflectance $R_{top}$ with respect to an effective groove depth d and a push-pull signal PPb, and FIG. 2B is an enlarged view showing an area A of FIG. 2A. In FIG. 2B, each of a curved line $L_0$, a curved line $L_A$, a curved line $L_B$, and a curved line $L_C$ represents the following maximum reflectance $R_{top}$ of the optical information recording medium 10.

Curved line $L_0$: maximum reflectance $R_{top}$ of the optical information recording medium in which only the reflective layer and the protection layer are laminated without forming the recording layer on the substrate Curved line $L_A$: maximum reflectance $R_{top}$ of the optical information recording medium 10 having a deep groove Curved line $L_B$: maximum reflectance $R_{top}$ of the optical information recording medium 10 having a groove with a specified depth Curved line $L_C$: maximum reflectance $R_{top}$ of the optical information recording medium 10 having a shallow groove The effective groove depth d that is the horizontal axis of FIGS. 2A and 2B is a groove depth at which a laser beam actually arrives, and particularly, a depth of the reflective layer 3. The depth of the reflective layer 3 depends on both the groove depth D of the substrate 1 and optical density OD (that is, a thickness t of the recording layer 2). Hereinafter, in a range of a specified optical density OD, the optical density OD which is a minimum value is referred to as a minimum optical density $OD_{min}$, and the optical density OD which is a maximum value is referred to as a maximum optical density $OD_{max}$. Here, the thickness t of the recording layer 2 is a thickness of the recording layer 2 in the groove 1a.

Figure 3:
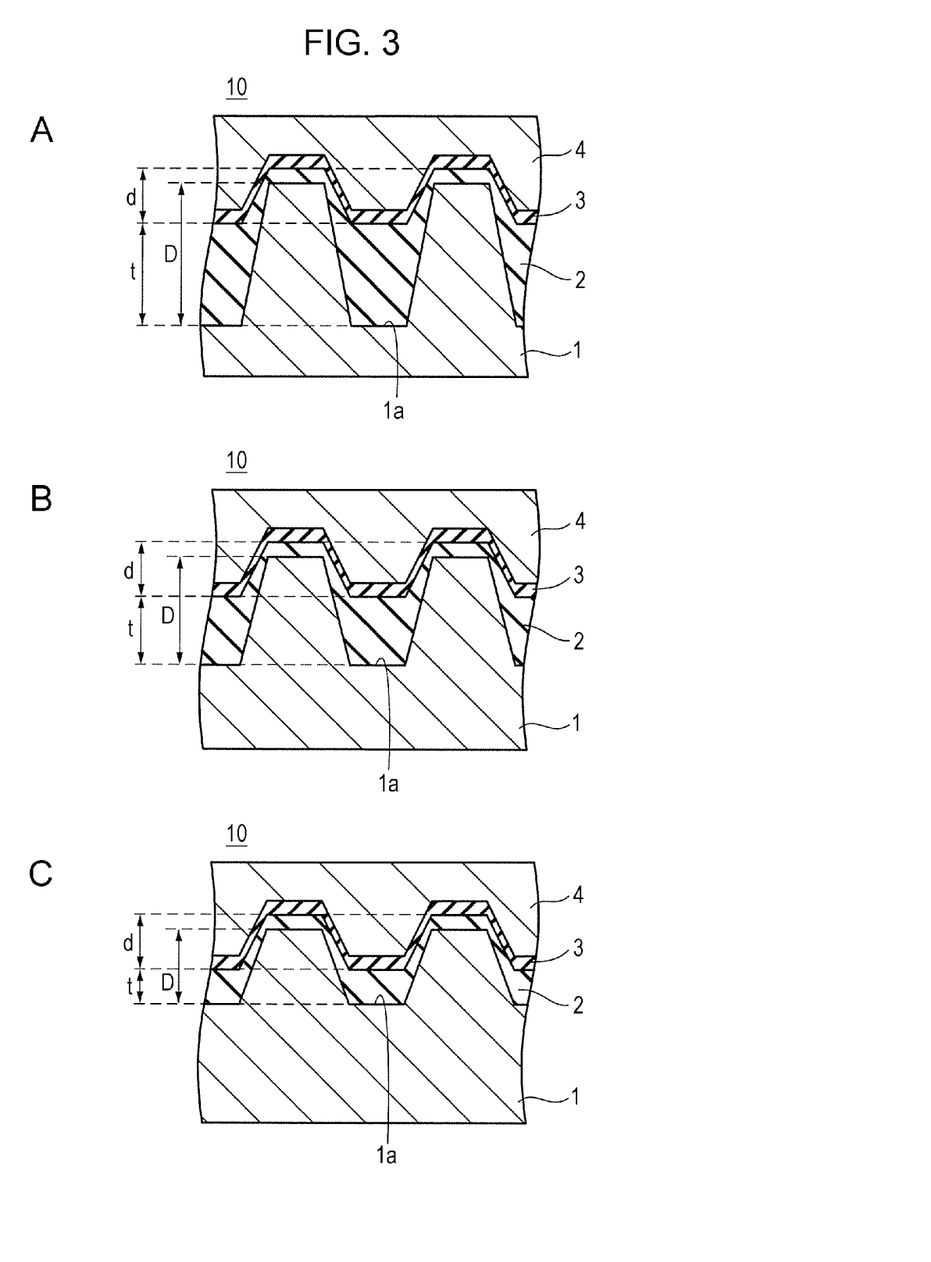
FIG. 3A is an enlarged cross-sectional view showing a part of an optical information recording medium having a deep groove.
FIG. 3B is an enlarged cross-sectional view showing a part of an optical information recording medium having a groove with a specified depth.
FIG. 3C is an enlarged cross-sectional view showing a part of an optical information recording medium having a shallow groove.

FIG. 3A to 3C are enlarged cross-sectional views showing a part of the optical information recording medium having a deep groove, a groove with a specified depth, and a shallow groove, respectively. Here, the groove with the specified depth denotes a groove in a range in which the groove depth D is a specified minimum depth $D_{min}$ or larger and a specified maximum depth $D_{max}$ or less, the deep groove denotes a groove deeper than the groove with the specified depth, and the shallow groove denotes a groove shallower than the groove with the specified depth.

Hereinafter, with reference to FIGS. 2A to 3C, a principle of compatibility between a push-pull signal PPb and a maximum reflectance $R_{top}$ in the optical information recording medium 10 according to the embodiment will be described.

Characteristics of the push-pull signal PPb do not rely on the groove depth D of the substrate 1, and therefore the following characteristics are shown regardless of the groove 1a being one of the deep groove (see FIG. 3A), the groove with the specified depth (see FIG. 3B), and the shallow groove (see FIG. 3C). That is, when the effective groove depth d is in a range of $0 \leq d \leq \lambda/4$, polarity of the push-pull signal becomes "positive". When the effective groove depth d is $\lambda/8$, the push-pull signal becomes a maximum.

As shown in FIG. 2A, from the intersection between a straight line that defines upper and lower limits of a standard range of the push-pull signal PPb and a curved line of the push-pull signal PPb, a range of the effective groove depth d that satisfies the standard range of the push-pull signal PPb is calculated.

Meanwhile, characteristics of the maximum reflectance $R_{top}$ do rely on the groove depth D of the substrate 1, and therefore the following characteristics are shown depending on whether the groove 1a is one of the deep groove (see FIG. 3A), the groove with the specified depth (see FIG. 3B), and the shallow groove (see FIG. 3C). That is, when the effective groove depth d is in a range of $0 \leq d \leq \lambda/4$, the maximum reflectance $R_{top}$ shows a tendency to increase along with a reduction in the effective groove depth d from $\lambda/4$. When the effective groove depth d becomes shallow and approaches "0", there is a tendency that the maximum reflectance reduces due to the optical information recording medium 10 in which the groove depth D of the substrate 1 is deep.

When the groove depth D is made less than the specified minimum depth $D_{min}$, the maximum reflectance $R_{top}$ can be improved compared to a case in which the groove depth D is set to a specified groove depth as shown in the curved line $L_C$ of FIG. 2B. However, in practice, in the range of the effective groove depth d that satisfies the standard of the push-pull signal PPb, it is difficult to reduce the groove depth D to less than the specified minimum depth $D_{min}$ in this manner.

The difficulty in reducing the groove depth D is caused due to the following reason. In order to satisfy recording characteristics, higher optical density OD (thickness t of the recording layer 2) than a certain degree is required regardless of the groove depth D of the substrate 1. That is, a minimum optical density $OD_{min}$ (minimum thickness $t_{min}$ of the recording layer 2) exists for the optical density OD (thickness t of the recording layer 2). When setting the optical density OD so as to satisfy the minimum optical density $OD_{min}$ (minimum depth $t_{min}$ of the recording layer 2) while reducing the groove depth D to less than the specified minimum depth $D_{min}$, the effective groove depth d becomes too shallow resulting in deviation from the standard range of the push-pull signal PPb. Thus, in the range of satisfying the standard of the push-pull signal PPb, it is difficult to reduce the groove depth D to less than the specified minimum depth $D_{min}$.

Meanwhile, in the range of the effective groove depth d satisfying the standard range of the push-pull signal PPb, when increasing the groove depth D of the substrate 1 to larger than the specified maximum depth $D_{max}$, the maximum reflectance $R_{top}$ reduces to a standard value or less as shown in the curved line $L_A$ of FIG. 2B.

Such a reduction in the maximum reflectance $R_{top}$ is caused by the following reason. In order to set the effective groove depth d so as to satisfy the standard range of the push-pull signal PPb while increasing the groove depth D of the substrate 1 to larger than the specified maximum depth $D_{max}$, it is necessary that a large amount of the organic dye be accumulated in the groove 1a and the optical density OD (that is, thickness t of the recording layer 2) be increased to larger than the maximum optical density $OD_{max}$. When increasing the optical density OD in this manner, light absorption by the recording layer 2 is increased, which leads to the reduction in the maximum reflectance $R_{top}$ as described above.

As above, in order to achieve a good balance between the push-pull signal PPb and the maximum reflectance $R_{top}$ in the optical information recording medium 10, it is understood that the following is necessarily considered.

Since the effective groove depth d relies on both the groove depth D and the optical density OD, it is necessary that both variables of the groove depth D and the optical density OD be considered in order to enable both the push-pull signal PPb and the maximum reflectance $R_{top}$ to be in the standard range.

Both the push-pull signal PPb and the maximum reflectance $R_{top}$ satisfying the standard range has a significantly limited range among combinations of the groove depth D and the optical density OD. Specifically, the push-pull signal PPb and the maximum reflectance $R_{top}$ satisfying the standard range has a significantly limited range such that the groove depth D of the substrate 1 is the specified minimum depth $D_{min}$ or larger and the specified maximum depth $D_{max}$ or less, and the optical density D is the minimum optical density $OD_{min}$ or larger and the maximum optical density $OD_{max}$ or less.

As described above, the present inventors have found that, in order to enable both the push-pull signal PPb and the maximum reflectance $R_{top}$ to satisfy the standard range, setting both variables of the groove depth D and the optical density OD is important. Thus, it is possible to introduce a new concept to the design philosophy of the optical information recording medium 10 and widen a range of selection of the material of the reflective layer 3.

[5. Method of Manufacturing Optical Information Recording Medium]

Next, an example of a method of manufacturing the optical information recording medium according to an embodiment of the present technology will be described.

(Process of Molding Substrate)

First, the substrate 1 with an uneven surface formed on one main surface is molded. As a molding method of the substrate 1, for example, an injection molding (injection) method, a photo polymerization method (2P method: photo polymerization), or the like can be used.

(Method of Forming Recording Layer)

Next, an organic dye is dissolved in a solvent to prepare a coating material. As the solvent, for example, aliphatic or alicyclic hydrocarbon solvents such as hexane, heptane, octane, decane, cyclohexane, methyl cyclohexane, ethyl cyclohexane, dimethylcyclohexane, aromatic hydrocarbon solvents such as toluene, xylene, benzene, halogenated hydrocarbon solvents such as carbon tetrachloride, chloroform, tetrachloroethane, dibromoethane, alcohol solvents such as methanol, ethanol, isopropyl alcohol, pentanol, isomethyl butanol, pentyl alcohol, hexanol, heptanol, octafluoropentanol, allyl alcohol, methyl cellosolve, ethyl cellosolve, tetrafluoropropanol, cyclopentanol, methyl cyclopentanol, cyclohexanol, methyl cyclohexanol, ether solvents such as diethyl ether, dibutyl ether, diisopropyl ether, dioxane, ketone solvents such as acetone, 3-hydroxy-3-methyl-2-butanone, ester solvents such as ethyl acetate and methyl lactate, and water, and the like can be used. These can be used alone or in mixture of a plurality thereof. Next, by evaporating the solvent while uniformly coating the substrate 1 with a coating material prepared by, for example, a spin coating method, the recording layer 2 is formed.

(Process of Depositing Reflective Layer)

Next, the substrate 1 is conveyed to a vacuum chamber in which a target including, for example, Al as the main component is provided, and the inside of the vacuum chamber is vacuumized to be a predetermined pressure. Next, by sputtering the target while introducing a process gas such as Ar gas or the like into the vacuum chamber, the reflective layer 3 is deposited on the recording layer 2.

(Process of Forming Protection Layer)

Next, a photosensitive resin such as an ultraviolet curing resin (UV curing resin) or the like is spin-coated on the reflective layer 3 by, for example, a spin coating method, and then the photosensitive resin is irradiated with light such as ultraviolet rays or the like to be cured. Thus, the protection layer 4 is formed on the reflective layer 3.

By the above-described process, the optical information recording medium for the purpose can be obtained.

(Effect)

According to an embodiment of the present technology, by the combination of the ranges of the optical density of the recording layer 2 and the depth D of the groove 1a of the substrate 1, a reduction in the maximum reflectance $R_{top}$ is suppressed, and the push-pull signal PPb at an unrecorded time is improved. Thus, it is possible to achieve a good balance between an excellent push-pull signal PPb at an unrecorded time and the maximum reflectance $R_{top}$.

EXAMPLES

Hereinafter, the present technology will be described in detail by Examples, but is not limited to only Examples.

In the present examples, in the measurement of the optical density (OD), ETA-RT (model name: ETA-RT3 and serial No: 050707) of Audiodev Co., was used. In addition, at the time of measurement, Corelation Factor was set to "1" (value not corrected).

Also, in the measurement of the groove depth of the substrate, Argus of Dr. Schwab Co., was used.

(Samples 1-1 to 1-8)

First, by injection molding, a substrate made of a polycarbonate resin was formed. At this time, an uneven surface including a land and a groove was formed on one main surface of the substrate. A pitch (that is, track pitch) of the land and the groove was 1.6 μm, and a depth of the groove was 200 nm.

Next, a coating material containing a phthalocyanine dye was prepared. Next, the prepared coating material was coated on the uneven surface of the substrate by the spin-coating method, and an organic dye film was deposited. At this time, deposition conditions of the organic dye film were adjusted so that the optical density (OD) was 0.329 (sample 1-1), 0.364 (sample 1-2), 0.382 (sample 1-3), 0.452 (sample 1-4), 0.515 (sample 1-5), 0.655 (sample 1-6), 0.690 (sample 1-7), and 0.746 (sample 1-8).

Next, an Al film with a film thickness of 50 nm was deposited on the organic dye film by sputtering. Next, an ultraviolet curing resin was coated on the substrate by the spin coating method, and the ultraviolet curing resin was cured by irradiation with ultraviolet rays. Thus, a protection layer was formed on the substrate.

By the above, the write-once optical information recording medium for the purpose was obtained.

(Sample 2-1)

Except that the deposition conditions of the organic dye film were adjusted so that the optical density (OD) was 0.515 and an Ag film with a film thickness of 65 nm was deposited on the organic dye film, the write-once optical information recording medium was obtained in the same manner as samples 1-1 to 1-8.

(Estimation)

Figure 4:
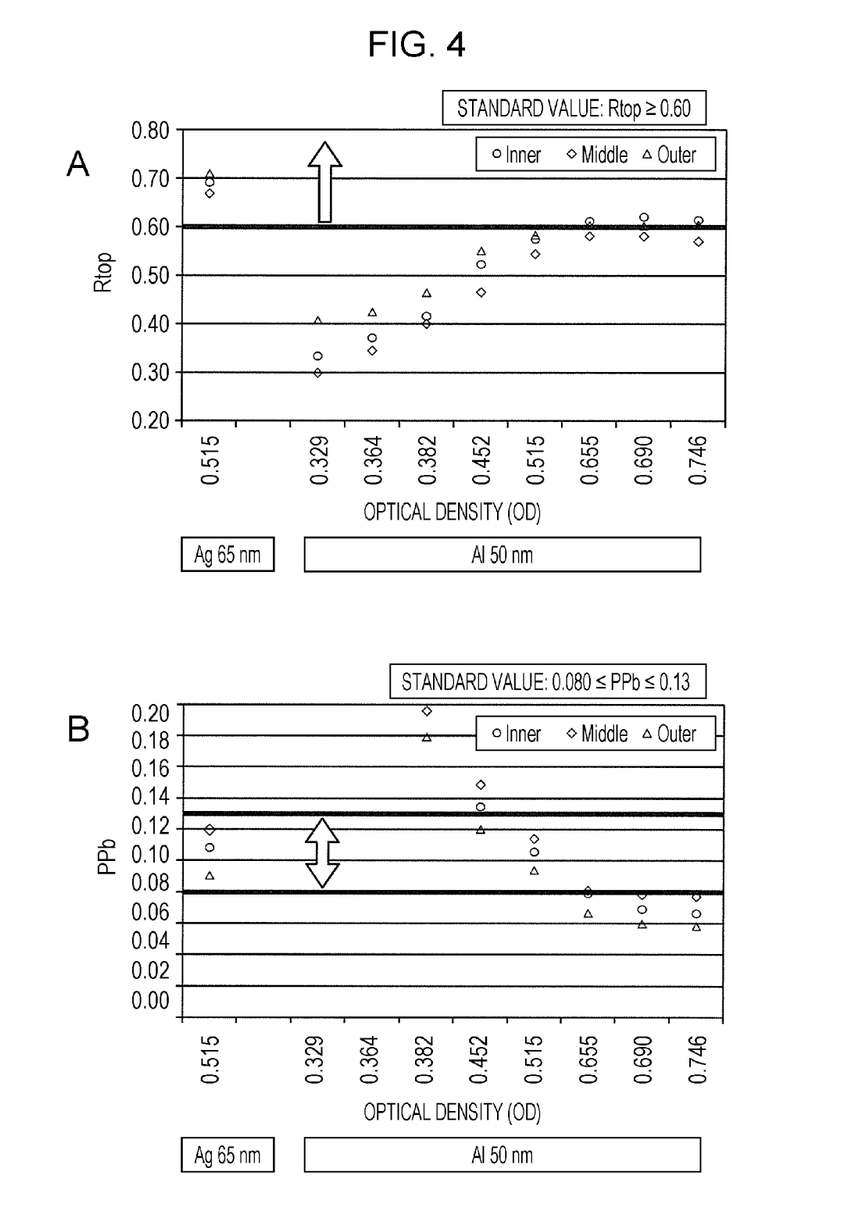
FIG. 4A is a view showing an evaluation result of a maximum reflectance $R_{top}$ of a write-once optical information recording medium in samples 1-1 to 1-8 and 2-1.
FIG. 4B is a view showing an evaluation result of a push-pull signal PPb at an unrecorded time of a write-once optical information recording medium in samples 1-1 to 1-8 and 2-1.

In an inner peripheral portion (radius 24 mm), a center peripheral portion (radius 40 mm), and an outer peripheral portion (radius 58 mm) of the write-once optical information recording medium of samples 1-1 to 1-8 and 2-1 obtained in the manner described above, the maximum reflectance $R_{top}$ and the push-pull signal PPb at an unrecorded time were estimated. The results are shown in FIGS. 4A and 4B.

(Discussion)

The following was found from the above-described estimation results.

When using the Ag film as the reflective layer, the maximum reflectance $R_{top}$ is a standard value of 0.60 or larger at the optical density of 0.515. Meanwhile, when using the Al film as the reflective layer, the maximum reflectance $R_{top}$ is less than the standard value of 0.60 at the optical density of 0.515.

When using the Al film as the reflective layer, in the range of the optical density of 0.329 to 0.746, there is a tendency that the maximum reflectance $R_{top}$ increases along with an increase in the optical density.

When using the Ag film as the reflective layer, the push-pull signal PPb at an unrecorded time is in a range of a standard value of 0.080 to 0.13 at the optical density of 0.515. Meanwhile, even when using the Al film as the reflective layer, the push-pull signal PPb at an unrecorded time is in the range of the standard value of 0.080 to 0.13 at the optical density of 0.515.

When using the Al film as the reflective layer, in a range in which the optical density is 0.329 or larger and 0.746 or less, there is a tendency that the push-pull signal PPb decreases along with an increase in the optical density.

Therefore, when using the Al film as the reflective layer, it is considered that both the maximum reflectance $R_{top}$ and the push-pull signal PPb at an unrecorded time simultaneously satisfying the standard value is difficult.

In addition, when the maximum reflectance $R_{top}$ and the push-pull signal PPb at an unrecorded time deviate from the standard value, there is a tendency that recording or reproduction of a write-once information recording medium by a general consumer drive is difficult.

(Sample 3-1)

Except that the depth of the groove was 198 nm, the write-once optical information recording medium was obtained in the same manner as sample 1-5.

(Sample 3-2)

Except that the depth of the groove was 220 nm, the write-once optical information recording medium was obtained in the same manner as sample 1-5.

(Sample 4-1)

Except that the optical density was 0.560, the write-once optical information recording medium was obtained in the same manner as sample 3-1.

(Sample 4-2)

Except that the optical density was 0.560, the write-once optical information recording medium was obtained in the same manner as sample 3-2.

(Sample 5-1)

Except that the optical density was 0.600, the write-once optical information recording medium was obtained in the same manner as sample 3-1.

(Sample 5-2)

Except that the optical density was 0.600, the write-once optical information recording medium was obtained in the same manner as sample 3-2.

(Sample 6-1)

Except that the optical density was 0.710, the write-once optical information recording medium was obtained in the same manner as sample 3-1.

(Sample 6-2)

Except that the optical density was 0.710, the write-once optical information recording medium was obtained in the same manner as sample 3-2.

(Estimation)

Figure 5:
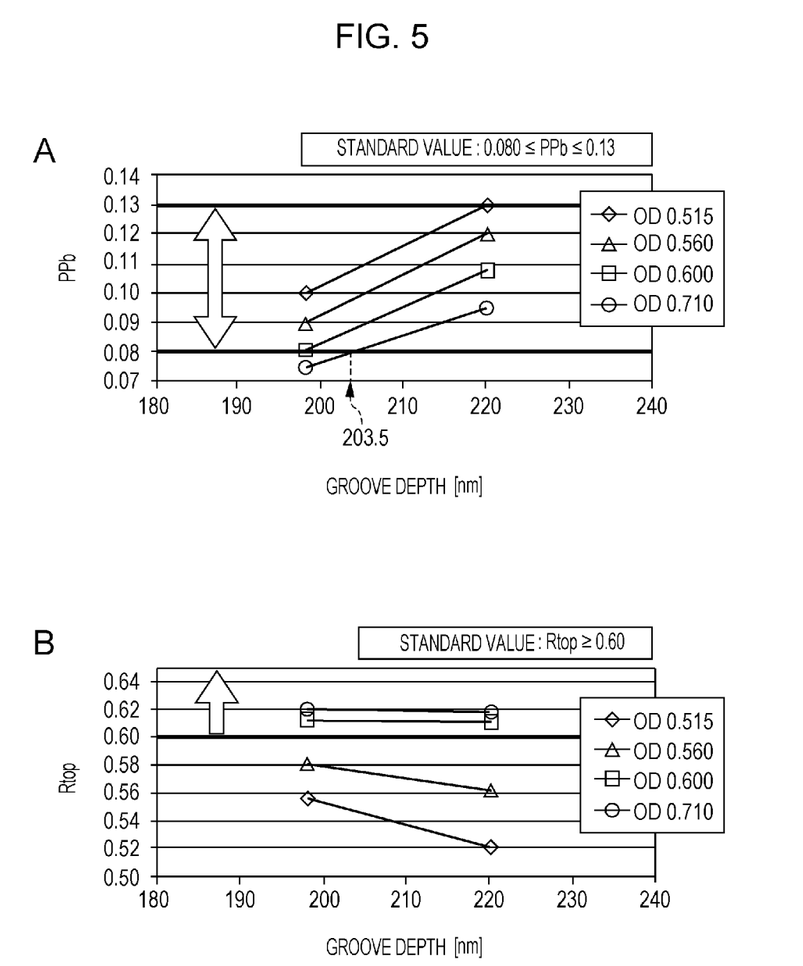
FIG. 5A is a view showing an evaluation result of a push-pull signal PPb at an unrecorded time of a write-once optical information recording medium in samples 3-1 to 6-2.
FIG. 5B is a view showing an evaluation result of a maximum reflectance $R_{top}$ of a write-once optical information recording medium in samples 3-1 to 6-2.

In the center peripheral portion (radius 40 mm) of the write-once optical information recording medium of samples 3-1 to 6-2 obtained in the manner described above, the maximum reflectance $R_{top}$ and the push-pull signal PPb at an unrecorded time were estimated. The results are shown in Table 1 and FIGS. 5A and 5B.

Table 1 shows the estimation results of the write-once optical information recording medium of samples 3-1 to 6-2.

TABLE 1

| | Groove depth (D) [nm] | Optical density (OD) | Push-pull signal PPb | Maximum reflectance $R_{top}$ |
|---|---|---|---|---|
| sample 3-1 | 198 | 0.515 | 0.1 | 0.557 |
| Sample 3-2 | 220 | 0.515 | 0.13 | 0.521 |
| Sample 4-1 | 198 | 0.560 | 0.09 | 0.582 |
| Sample 4-2 | 220 | 0.560 | 0.12 | 0.563 |
| Sample 5-1 | 198 | 0.600 | 0.081 | 0.612 |
| Sample 5-2 | 220 | 0.600 | 0.108 | 0.61 |
| Sample 6-1 | 198 | 0.710 | 0.075 | 0.62 |
| Sample 6-2 | 220 | 0.710 | 0.095 | 0.618 |

(Discussion)

The following was found from the above-described estimation results.

In cases in which the optical density (OD) is 0.515, 0.560, and 0.600, when the groove depth is increased in the range of 198 nm to 220 nm, the groove depth can be increased while satisfying the standard value of the push-pull signal PPb at an unrecorded time.

In the case in which the optical density (OD) is 0.710, when the groove depth is increased in the range of 203.5 nm to 220 nm, the groove depth can be increased while satisfying the standard value of the push-pull signal PPb at an unrecorded time. Also, a lower limit of 203.5 nm of the groove depth was obtained from the intersection of a straight line with the optical density of 0.710 and a straight line with the push-pull signal PPb at an unrecorded time of 0.08.

In the cases in which the optical density (OD) is 0.515 and 0.560, when the groove depth is increased in the range of 198 nm to 220 nm, there is a tendency that the maximum reflectance $R_{top}$ is reduced as well, by less than the standard value of 0.60. Meanwhile, in the cases in which the optical density (OD) is 0.600 and 0.710, when the groove depth is increased in the range of 198 nm to 220 nm, there is a tendency that the maximum reflectance $R_{top}$ is held almost constant as well as being larger than or equal to the standard value of 0.60.

That is, by combining a predetermined range (larger than 0.560 and less than or equal to 0.600) of the optical density of the recording layer and a predetermined range (198 nm to 220 nm) of the groove depth of the substrate, variation of the reflectance with respect to a change in the groove depth can be suppressed while satisfying the standard value of the push-pull signal PPb at an unrecorded time. In addition, by combining a predetermined range (larger than 0.560 and less than or equal to 0.710) of the optical density of the recording layer and a predetermined range (203.5 nm to 220 nm) of the groove depth of the substrate, variation of the reflectance with respect to the change in the groove depth can be suppressed while satisfying the standard value of the push-pull signal PPb at an unrecorded time.

Thus, from the viewpoint of the maximum reflectance $R_{top}$ and the push-pull signal PPb at an unrecorded time, it is preferable that the optical density (OD) be set in the range larger than 0.560 and less than or equal to 0.600, and the groove depth be set in the range of 198 nm to 220 nm.

In addition, from the viewpoint of the maximum reflectance $R_{top}$ and the push-pull signal PPb at an unrecorded time, it is preferable that the optical density (OD) be set in the range larger than 0.560 and less than or equal to 0.700, and the groove depth be set in the range of 198 nm to 220 nm.

In addition, from the viewpoint of the maximum reflectance $R_{top}$ and the push-pull signal PPb at an unrecorded time, it is preferable that the optical density (OD) be set in the range larger than 0.560 and less than or equal to 0.710, and the groove depth be set in the range of 203.5 nm to 220 nm.

above, the embodiments of the present technology have been described in detail, but the present technology is not limited to the above-described embodiments, and various modifications is possible based on the technical concept of the present technology.

For example, configurations, methods, processes, shapes, materials, numerical values, and the like used in the above-described embodiments are merely examples, and different configurations, methods, processes, shapes, materials, numerical values, and the like from these can be used, as necessary.

In addition, the configurations, methods, processes, shapes, materials, numerical values, and the like of the above-described embodiments can be combined with each other without departing from the spirit of the present technology.

In addition, in the above-described embodiments, a case of applying the present technology to the optical information recording medium which has a configuration in which the recording layer, the reflective layer, and the protection layer are laminated on the substrate in this stated order and in which recording or reproduction of information signals is performed by irradiating the recording layer with the laser beam from the substrate side has been described as an example, but the present technology is not limited to this example. For example, the present technology can be applied to an optical information recording medium (for example, BD: Blu-ray disc (registered trademark)) which has a configuration in which the reflective layer, the recording layer, and a light transmission layer are laminated on the substrate in this stated order and in which recording or reproduction of the information signals is performed by irradiating the recording layer with a laser beam from the light transmission layer side, or an optical information recording medium (for example, digital versatile disc (DVD)) which has a configuration in which the recording layer and the reflective layer are provided between two substrates and in which recording or reproduction of the information signals is performed by irradiating the recording layer with a laser beam from one substrate side.

In addition, in the above-described embodiments, an example in which the present technology is applied to the optical information recording medium having the recoding layer in a single layer has been described, but the present technology can be applied to an optical information recording medium having the recording layer in at least two layers while not being limited to this.

In addition, the present technology can adopt the following configuration.

(1) An optical information recording medium including:
a substrate that has a recessed portion on a surface thereof;
a recording layer; and
a reflective layer,
wherein degradation of reflectance is suppressed by combination of ranges of an optical density of the recording layer and a depth of the recessed portion of the substrate.

(2) The optical information recording medium described in (1), wherein the range of the optical density of the recording layer is a range larger than 0.560 and less than or equal to 0.700, and the range of the depth of the recessed portion of the substrate is a range of 198 nm to 220 nm.

(3) The optical information recording medium described in (1) or (2), wherein recording or reproduction of information signals is performed by condensing light having a wavelength in a range of 770 nm to 790 nm using an objective lens having a numerical aperture in a range of 0.44 to 0.46 and irradiating the recording layer with the condensed light from the surface of the substrate side.

(4) The optical information recording medium described in any one of (1) to (3), wherein the reflectance is maintained in a range of 0.6 or larger.

(5) The optical information recording medium described in any one of (1) to (4), wherein, by the combination of the ranges of the optical density of the recording layer and the depth of the recessed portion of the substrate, a push-pull signal is improved.

(6) The optical information recording medium described in (5), wherein the push-pull signal is within a range of 0.08 to 0.13.

(7) The optical information recording medium described in any one of (1) to (6), wherein the reflective layer includes aluminum as a main component.

(8) The optical information recording medium described in any one of (1) to (7), wherein the recording layer includes an organic dye.

(9) The optical information recording medium described in any one of (1) and (4) to (8), wherein the range of the optical density of the recording layer is a range larger than 0.560 and less than or equal to 0.710, and the range of the depth of the recessed portion of the substrate is a range of 203.5 nm to 220 nm.

(10) The optical information recording medium described in (9), wherein recording or reproduction of information signals is performed by condensing light having a wavelength in a range of 770 nm to 790 nm using an objective lens having a numerical aperture in a range of 0.44 to 0.46 and irradiating the recording layer with the condensed light from the surface of the substrate side.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Explanation of Reference Numerals
1 substrate,
1a groove (recessed portion)
1b land (projecting portion)
2 recording layer
3 reflective layer
4 protection layer
10 optical information recording medium

The invention claimed is:

1. An optical information recording medium comprising:
a substrate that has a recessed portion on a surface thereof;
a recording layer that includes an organic dye; and
a reflection layer that includes aluminum as a main component thereof, wherein degradation of reflectance is suppressed by combination of ranges of an optical density of the recording layer and a depth of the recessed portion of the substrate.

2. The optical information recording medium according to claim 1, wherein the range of the optical density of the recording layer is a range larger than 0.560 and less than or equal to 0.700, and the range of the depth of the recessed portion of the substrate is a range of 198 nm to 220 nm.

3. The optical information recording medium according to claim 2, wherein recording or reproduction of information signals is performed by condensing light having a wavelength in a range of 770 nm to 790 nm using an objective lens having a numerical aperture in a range of 0.44 to 0.46 and irradiating the recording layer with the condensed light from the surface of the substrate side.

4. The optical information recording medium according to claim 1, wherein the reflectance is maintained in a range of 0.6 or larger.

5. The optical information recording medium according to claim 1, wherein, by the combination of the ranges of the optical density of the recording layer and the depth of the recessed portion of the substrate, a push-pull signal is improved.

6. The optical information recording medium according to claim 5, wherein the push-pull signal is within a range of 0.08 to 0.13.

7. The optical information recording medium according to claim 1, wherein the organic dye is a phthalocyanine dye.

* * * * *